US012691633B2

(12) United States Patent
Shim

(10) Patent No.: US 12,691,633 B2
(45) Date of Patent: Jul. 28, 2026

(54) MANUFACTURING METHOD FOR LIGHTWEIGHT PARTS COMBINING POROUS METAL SUBSTRATE AND FUNCTIONAL RESIN

(71) Applicant: Korea Maritime University Industry—Academic Cooperation Foundation, Busan (KR)

(72) Inventor: Do Sik Shim, Busan (KR)

(73) Assignee: KOREA MARITIME UNIVERSITY INDUSTRY-ACADEMIC COOPERATION FOUNDATION, Busan (KR)

( * ) Notice: Subject to any disclaimer, the term of this patent is extended or adjusted under 35 U.S.C. 154(b) by 259 days.

(21) Appl. No.: 18/437,016

(22) Filed: Feb. 8, 2024

(65) Prior Publication Data

US 2024/0269918 A1 Aug. 15, 2024

(30) Foreign Application Priority Data

Feb. 10, 2023 (KR) ........................ 10-2023-0018225

(51) Int. Cl.
*B29C 64/118* (2017.01)
*B33Y 10/00* (2015.01)
*B29K 705/00* (2006.01)

(52) U.S. Cl.
CPC ............ *B29C 64/118* (2017.08); *B33Y 10/00* (2014.12); *B29K 2705/00* (2013.01); *B29K 2715/003* (2013.01)

(58) Field of Classification Search
CPC ......... B28B 1/001; B33Y 10/00; B33Y 30/00; B33Y 50/02; B33Y 80/00; B29C 64/118;
(Continued)

(56) References Cited

U.S. PATENT DOCUMENTS

2010/0274256 A1* 10/2010 Ritchey .................. A61L 2/081
606/96
2016/0360828 A1* 12/2016 Guyan ................. A43B 13/141
(Continued)

FOREIGN PATENT DOCUMENTS

KR 102229822 3/2021

*Primary Examiner* — Jamel M Nelson
(74) *Attorney, Agent, or Firm* — NORTON ROSE FULBRIGHT US LLP

(57) ABSTRACT
A method for manufacturing a lightweight part including a porous metal matrix having a functional resin bonded thereto is disclosed. The method includes a porous metal matrix preparation step of preparing a porous metal matrix; a base layer deposition step in which while a nozzle of a FDM (Fused Deposition Modeling) 3D printer moves along a first predetermined movement coordinate path, the nozzle heats and extrudes a resin filament toward a surface of the porous metal matrix to infiltrate a molten resin into closed pores or depressions in the surface of the porous metal matrix, thereby forming a base layer bonded to the surface of the porous metal matrix; and a build layer deposition step in which while the nozzle moves along the first set movement coordinate path or a predetermined second set movement coordinate path different from the first set movement coordinate path, the nozzle heats and extrudes the resin filament toward the base layer such that one or more flat or curved build layers are deposited on the base layer, wherein the resin filament is made of a functional resin material.

5 Claims, 4 Drawing Sheets

(58) Field of Classification Search
    CPC ... B29C 64/209; B29C 64/227; B29C 64/236;
                 B29C 64/245; B29C 64/295; B29C
                 64/393; A43B 13/125; A43B 13/223;
                 A43B 13/122; B22F 10/14; B22F 10/16;
                 B22F 10/18; B22F 10/20; B22F 10/22
    See application file for complete search history.

(56)                      References Cited

U.S. PATENT DOCUMENTS

2019/0118467  A1       4/2019   Neboian et al.
2019/0224912  A1*      7/2019   Shuck ..................... B33Y 10/00
2023/0097038  A1*      3/2023   Constantinou ....... A43B 13/125
                                                          36/25 R

* cited by examiner

MANUFACTURING METHOD FOR LIGHTWEIGHT PARTS COMBINING POROUS METAL SUBSTRATE AND FUNCTIONAL RESIN

CROSS-REFERENCE TO RELATED APPLICATION

This application claims a benefit under 35 U.S.C. § 119(a) of Korean Patent Application No. 10-2023-0018225 filed on Feb. 10, 2023, on the Korean Intellectual Property Office, the entirety of disclosure of which is incorporated herein by reference for all purposes.

BACKGROUND

Field

The present disclosure relates to a method for manufacturing a lightweight part including a porous metal matrix having a functional resin bonded thereto. More specifically, the present disclosure relates to a method for manufacturing a lightweight part in which a functional resin is bonded to a porous metal matrix having pores.

Description of Related Art

In general, a porous metal has numerous pores in a metal material. The porous metal is a representative lightweight material and has excellent sound insulation/sound absorption, shock absorption, compressibility and electromagnetic wave shielding, machinability and thermal conductivity. Further, the porous metal may have a wide range of strengths by changing a density thereof.

In addition, the porous metal may be widely used in various industrial environments, especially, as structural materials, sound-insulating materials, vibration-proofing materials, heat exchangers, shock-absorbing materials, thermal insulation materials, filter materials, sound-absorbing materials, biomaterials, vibration-absorbing materials, etc.

The porous metal is especially used to make a part lighter. However, it is difficult to satisfy both lightness and strength using the porous material alone. Therefore, the lightweight part is manufactured by combining a porous material and a non-porous (solid) material with each other.

In a conventional scheme of combining the porous material and the non-porous material with each other, a porous metal material and a non-porous metal material are bonded to each other via welding. However, in this approach, when bonding the porous metal material and the non-porous metal material to each other, pores are generated, and heat affected zone (HAZ) and thermal deformation occur, which reduces a quality of a product. This scheme requires several processes to increase a production cost.

In another example, it is impossible to weld or bond a porous metal material and a non-porous functional resin to each other due to a difference in properties between the two materials.

SUMMARY

Accordingly, an inventor for the present disclosure has invented a method for manufacturing a lightweight part including a porous metal matrix having a functional resin bonded thereto, which may achieve lightening of the part by bonding a porous metal material and a non-porous functional resin to each other.

Thus, a purpose of the present disclosure is to provide a method for manufacturing a lightweight part including a porous metal matrix having a functional resin bonded thereto, thereby manufacturing the lightweight part to which various properties such as mechanical strength, corrosion resistance, wear resistance, and electrical insulation of the functional resin are imparted.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

One aspect of the present disclosure provides a method for manufacturing a lightweight part including a porous metal matrix having a functional resin bonded thereto, the method comprising: a porous metal matrix preparation step of preparing a porous metal matrix; a base layer deposition step in which while a nozzle of a FDM (Fused Deposition Modeling) 3D printer moves along a first predetermined movement coordinate path, the nozzle heats and extrudes a resin filament toward a surface of the porous metal matrix to infiltrate a molten resin into closed pores or depressions in the surface of the porous metal matrix, thereby forming a base layer bonded to the surface of the porous metal matrix; and a build layer deposition step in which while the nozzle moves along the first set movement coordinate path or a predetermined second set movement coordinate path different from the first set movement coordinate path, the nozzle heats and extrudes the resin filament toward the base layer such that one or more flat or curved build layers are deposited on the base layer, wherein the resin filament is made of a functional resin material.

In one embodiment, the resin filament is made of a functional polymer material.

In one embodiment, the porous metal matrix has closed pores defined therein, wherein the porous metal matrix is made of aluminum.

In one embodiment, each of the base layer and the build layer is formed as a combination of linear layers deposited by heating and extruding the resin filament through the nozzle, wherein the FDM (Fused Deposition Modeling) 3D printer deposits the linear layers under an extrusion condition of the resin filament set such that a nozzle speed is 1.5 mm/s, a nozzle temperature is 220 degrees C., and a porous metal matrix heating temperature is 70 degrees C.

According to the present disclosure, in the method for manufacturing the lightweight part including the porous metal matrix having the functional resin bonded thereto, the functional resin may be printed and be bonded onto the surface of the porous material, thereby manufacturing the lightweight part to which various properties such as mechanical strength, corrosion resistance, wear resistance, and electrical insulation of the functional resin have been imparted.

In addition to the effects as described above, specific effects in accordance with the present disclosure will be described together with following detailed descriptions for carrying out the disclosure.

DETAILED DESCRIPTIONS

Figure 1:
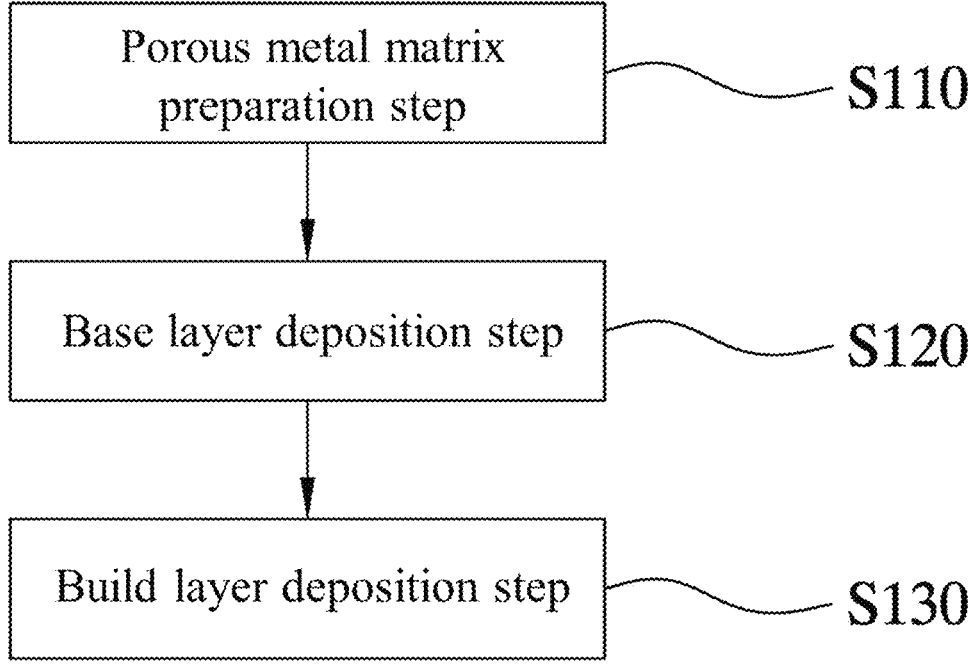
FIG. 1 is a flow chart for illustrating a method for manufacturing a lightweight part including a porous metal matrix having a functional resin bonded thereto according to one embodiment of the present disclosure.

Hereinafter, with reference to the attached drawings, a method for manufacturing a lightweight part including a porous metal matrix having a functional resin bonded thereto according to an embodiment of the present disclosure will be described in detail.

Advantages and features of the present disclosure, and a method of achieving the advantages and features will become apparent with reference to embodiments described later in detail together with the accompanying drawings. However, an embodiment of embodiments of the present disclosure are not limited to the embodiments as disclosed under, but may be implemented in various different forms. Thus, these embodiments are set forth only to make the present disclosure complete, and to entirely inform the scope of the present disclosure to those of ordinary skill in the technical field to which the present disclosure belongs, and the present disclosure is only defined by the scope of the claims.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for illustrating embodiments of the present disclosure are illustrative, and an embodiment of embodiments of the present disclosure are not limited thereto.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

It will also be understood that when a first element or layer is referred to as being present "on" a second element or layer, the first element may be disposed directly on the second element or may be disposed indirectly on the second element with a third element or layer being disposed between the first and second elements or layers.

In descriptions of temporal relationships, for example, temporal precedent relationships between two events such as "after", "subsequent to", "before", etc., another event may occur therebetween unless "directly after", "directly subsequent" or "directly before" is not indicated.

When a certain embodiment may be implemented differently, a function or an operation specified in a specific block may occur in a different order from an order specified in a flowchart. For example, two blocks in succession may be actually performed substantially concurrently, or the two blocks may be performed in a reverse order depending on a function or operation involved.

The features of the various embodiments of the present disclosure may be partially or entirely combined with each other, and may be technically associated with each other or operate with each other. The embodiments may be implemented independently of each other and may be implemented together in an association relationship.

In interpreting a numerical value, the value is interpreted as including an error range unless there is no separate explicit description thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure presents a method for manufacturing a lightweight part by deposition of a functional resin on a porous metal matrix.

FIG. 1 is a flow chart for illustrating a method for manufacturing a lightweight part including a porous metal matrix having a functional resin bonded thereto according to one embodiment of the present disclosure.

Referring to FIG. 1, a method for manufacturing a lightweight part including a porous metal matrix having a functional resin bonded thereto according to one embodiment of the present disclosure may include a porous metal matrix preparation step (S110); a base layer deposition step (S120); and a build layer deposition step (S130).

In the porous metal matrix preparation step (S110), the method may prepare a porous metal matrix 100. For example, the porous metal matrix 100 may be aluminum foam. There is no particular limitation thereto, and any material having protrusions or depressions in a regular or irregular shape on a surface thereof may be used as the porous metal matrix.

Figure 2:
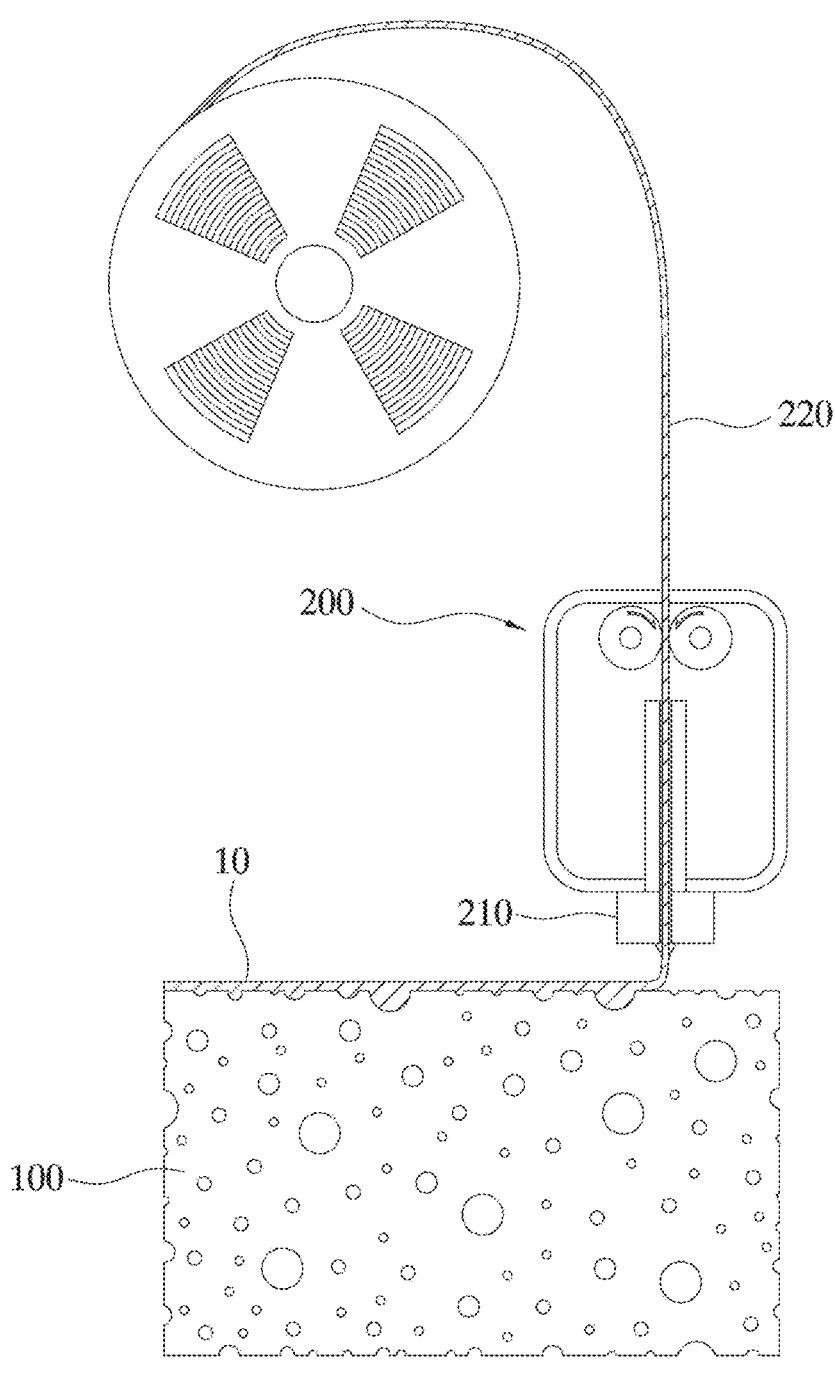
FIG. 2 is a diagram showing a process in which a base layer is deposited in a base layer deposition step as shown in FIG. 1.

As shown in FIG. 2 in the base layer deposition step (S120), a nozzle 210 of a FDM (Fused Deposition Modeling) 3D printer 200 is moved along a first predetermined movement coordinate path while heating and extruding a resin filament 220 to infiltrate a molten resin into closed pores or depressions in the surface of the porous metal matrix 100, such that a base layer 10 bonded to the porous metal matrix 100 may be formed. For example, the first set movement coordinate path may be a coordinate path set such that the nozzle 210 moves along at least one of X and Y axes parallel to row and column directions of the surface of the porous metal matrix 100. The base layer 10 covering the surface of the porous metal matrix 100 may be formed by repeating movement of the nozzle along the first set movement coordinate path. At this time, the base layer 10 may be formed as combination of linear layers (not shown) obtained by melting and extruding a thread-shaped resin filament 220 in an overlapping manner in a horizontal direction.

This base layer deposition step (S120) may be performed to form a two-dimensional planar layer on the surface of the porous metal matrix 100.

Figure 3:
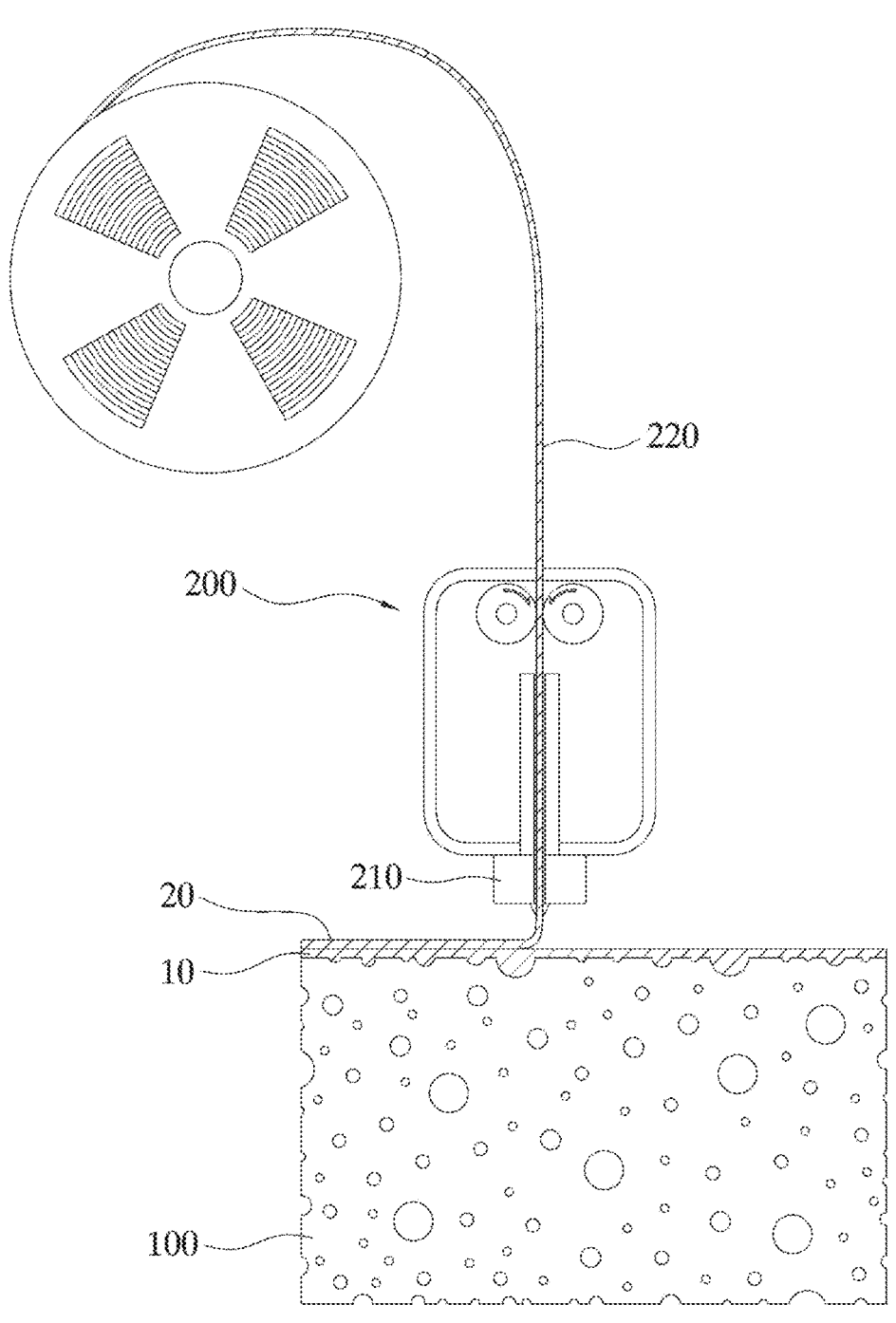
FIG. 3 is a diagram showing a process in which a build layer is deposited in a build layer deposition step as shown in FIG. 1.

As shown in FIG. 3 in the build layer deposition step (S130), the nozzle 210 is moved along the first set movement coordinate path or a predetermined second set movement coordinate path that is different from the first set move coordinate path while heating and extruding the resin filament 220 such that one or more flat or curved build layers 20 may be deposited on the base layer 10. For example, the second set movement coordinate path may be a coordinate path set such that the nozzle may move along at least one of an X-axis, a Y-axis, and a Z-axis parallel to row and column directions of and a height direction perpendicular to the surface of the porous metal matrix 100, respectively. Repeating the movement of the nozzle along the first set movement coordinate path or the second set movement coordinate path may allow one or more build layers 20 to be deposited so as to cover the base layer 10.

This build layer deposition step (S130) may be performed to form a two-dimensional or three-dimensional layer on the base layer 10.

The base layer 10 and the build layer 20 may be cured at room temperature.

The resin filament 220 used in these steps (S110, S120, and S130) may be made of a functional resin material. For example, the rein filament may be made of a functional polymer material.

When the base layer 10 and the build layer 20 are sequentially deposited on the surface of the porous metal matrix 100 using the method for manufacturing a lightweight part including a porous metal matrix having a functional resin bonded thereto according to one embodiment of the present disclosure, the base layer 10 and the build layer 20 are deposited in the molten state, and then are adhered to each other, and are cured. Some of the linear layers constituting the base layer 10 may penetrate into the pores of the porous metal matrix 100 and then harden, thereby generating a bonding force between the base layer 10 and the porous metal matrix 100. Therefore, the functional resin may be bonded to the surface of the porous metal matrix 100, so that a lightweight part in which the surface of the porous metal matrix 100 is covered with a strong functional resin may be manufactured.

Figure 4:
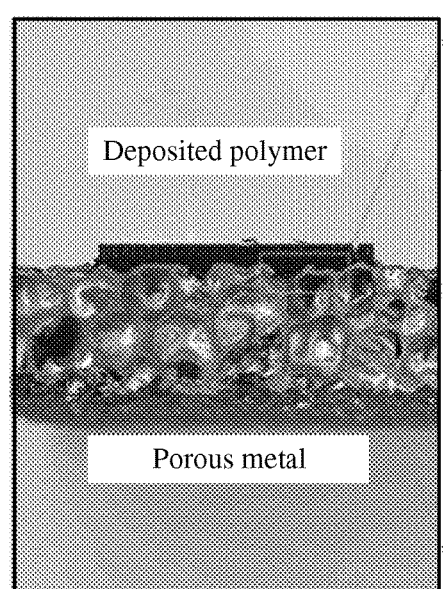
FIG. 4 shows a state in which a polymer has been deposited on a surface of a porous metal matrix using a process of manufacturing a lightweight part including a porous metal matrix having a functional resin bonded thereto according to one embodiment of the present disclosure.
Figure 4:
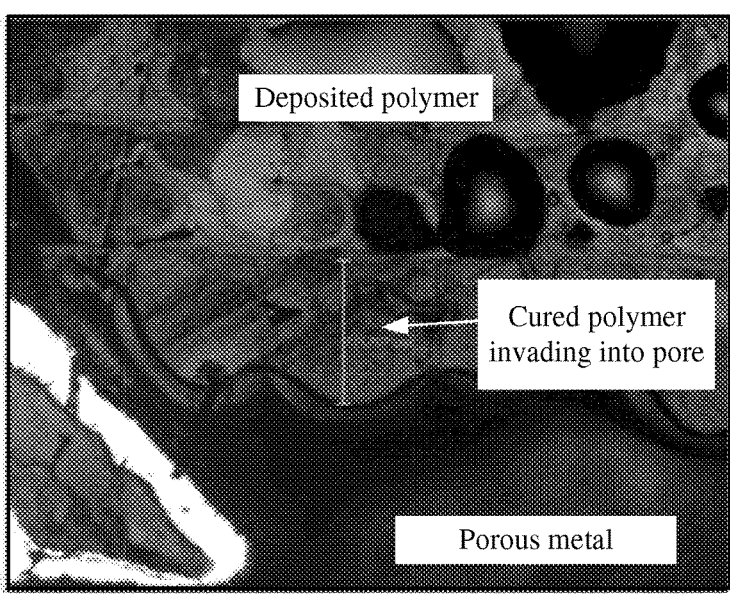

FIG. 4 shows a state in which a polymer has been deposited on a surface of a porous metal matrix using a process of manufacturing a lightweight part including a porous metal matrix having a functional resin bonded thereto according to one embodiment of the present disclosure.

As shown in FIG. 4, a polymer as a functional resin has been deposited on the surface of the porous metal matrix via the process of manufacturing the lightweight part including a porous metal matrix having a functional resin bonded thereto according to one embodiment of the present disclosure. As may be identified based on an enlarged cross-sectional view of a deposited portion, it is confirmed that the polymer penetrates into the pores of the porous metal matrix (foam) 100 and is bonded to the porous metal matrix 100.

In order to achieve the result of bonding the functional resin and the porous metal matrix to each other as identified in FIG. 4, the FDM (Fused Deposition Modeling) 3D printer may deposit the linear layers as follows: an extrusion condition of the resin filament may be set such that a nozzle speed is 1.5 mm/s, a nozzle temperature is 220 degrees C., and a porous metal matrix heating temperature is 70 degrees C. This extrusion condition of the resin filament may correspond to a condition for bonding to the polymer to the metal, and may vary depending on a type of the functional resin.

The method for manufacturing a lightweight part including a porous metal matrix having a functional resin bonded thereto according to one embodiment of the present disclosure may print and bond the functional resin onto the surface of the porous material, thereby manufacturing the lightweight part having various properties such as mechanical strength, corrosion resistance, wear resistance, and electrical insulation of the functional resin imparted thereto.

Figure 5:
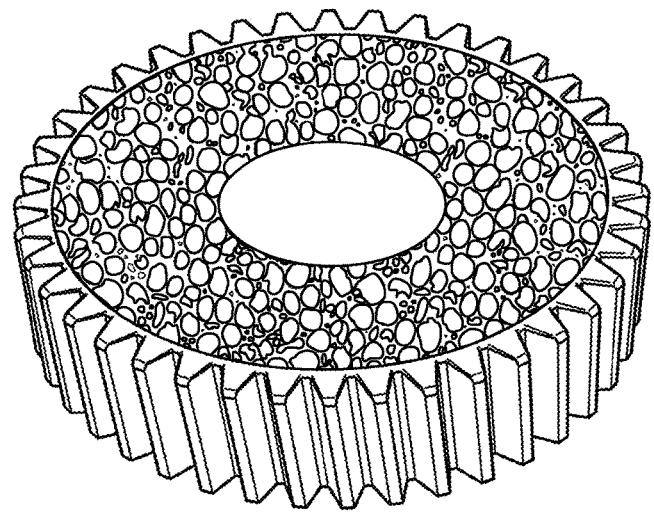
FIG. 5 is a diagram illustrating a lightweight part that may be manufactured using a method for manufacturing a lightweight part including a porous metal matrix having a functional resin bonded thereto according to one embodiment of the present disclosure.

For example, as shown in FIG. 5, the method may manufacture a part such as a lightweight gear composed of the porous metal as an inner material and the functional resin as an outer material. Further, the method may manufacture a lightweight part of various other shapes.

Although embodiments of the present disclosure have been described with reference to the accompanying drawings, embodiments of the present disclosure are not limited to the above embodiments, but may be implemented in various different forms. A person skilled in the art may appreciate that the present disclosure may be practiced in other concrete forms without changing the technical spirit or essential characteristics of the present disclosure. Therefore, it should be appreciated that the embodiments as described above is not restrictive but illustrative in all respects.

What is claimed is:

1. A method for manufacturing a part, the method comprising:

a porous metal matrix preparation step of preparing a porous metal matrix, wherein the metal matrix comprises a metal having closed pores defined therein;

a base layer deposition step in which while a nozzle of a fused deposition modeling 3D printer moves along a first predetermined movement coordinate path, the nozzle heats and extrudes a resin filament in linear layers toward a surface of the porous metal matrix to infiltrate a molten resin into pores or depressions in the surface of the porous metal matrix, thereby forming a base layer bonded to the surface of the porous metal matrix, wherein some of the linear layers constituting the base layer penetrate into the pores or depressions in the surface of the porous metal matrix and then harden, thereby generating a bonding force between the base layer and the porous metal matrix; and a build layer deposition step in which while the nozzle moves along the first set movement coordinate path or a predetermined second set movement coordinate path different from the first set movement coordinate path, the nozzle heats and extrudes the resin filament toward the base layer such that one or more flat or curved build layers are deposited on the base layer, wherein the resin filament is made of a functional resin.

2. The method of claim 1, wherein the resin filament is made of a functional polymer material.

3. The method of claim 2, wherein the porous metal matrix is made of aluminum.

4. The method of claim 3, wherein each of the base layer and the build layer is formed as a combination of linear layers deposited by heating and extruding the resin filament through the nozzle, wherein the fused deposition modeling 3D printer deposits the linear layers under an extrusion condition of the resin filament set such that a nozzle speed is 1.5 mm/s, a nozzle temperature is 220 degrees C., and a porous metal matrix heating temperature is 70 degrees C.

5. The method of claim 1, wherein the part is a gear comprising the porous metal matrix as an inner material and the functional resin as an outer material.

* * * * *